United States Patent [19]

Hehl

[11] 4,222,730
[45] Sep. 16, 1980

[54] ARRANGEMENT FOR INTERCHANGEABLY MOUNTING DIFFERENT INJECTION UNITS ON AN INJECTION MOLDING MACHINE

[76] Inventor: Karl Hehl, Arthur-Hehl-Strasse 32, 7298 Lossburg 1, Fed. Rep. of Germany

[21] Appl. No.: 71,374

[22] Filed: Aug. 30, 1979

[30] Foreign Application Priority Data

Aug. 30, 1978 [DE] Fed. Rep. of Germany ....... 2837761

[51] Int. Cl.² ............................................. B29F 1/06
[52] U.S. Cl. ................................. 425/450.1; 425/595; 425/DIG. 221; 425/190; 425/DIG. 223
[58] Field of Search ............. 425/450.1, 451.2, 451.7, 425/451.9, 589, 595, DIG. 221, DIG. 222, DIG. 223, 190

[56] References Cited

U.S. PATENT DOCUMENTS

| 3,465,387 | 9/1969 | Allard et al. .............. 425/DIG. 223 |
| 3,590,437 | 7/1971 | Annis et al. .................. 425/451.2 X |
| 3,669,599 | 6/1972 | Snider et al. ................. 425/451.2 X |
| 3,729,283 | 4/1973 | Eggenberger et al. ........... 425/451.2 |
| 3,890,081 | 6/1975 | Grundmann ...................... 425/450.1 |
| 3,905,741 | 9/1975 | Poncet .............................. 425/450.1 |
| 3,976,416 | 8/1976 | Hehl ............................. 425/451.2 X |
| 4,021,181 | 5/1977 | Hehl ............................... 425/450.1 |
| 4,047,871 | 9/1977 | Hehl ........................... 425/DIG. 223 |
| 4,080,144 | 3/1978 | Hehl ............................... 425/450.1 |

FOREIGN PATENT DOCUMENTS

1090094 9/1960 Fed. Rep. of Germany ........ 425/450.1

*Primary Examiner*—J. Howard Flint, Jr.
*Attorney, Agent, or Firm*—Joseph A. Geiger

[57] ABSTRACT

An arrangement in connection with the die closing unit of an injection molding machine for interchangeably mounting to the rear side of the stationary die carrier plate differently spaced pairs of tie rods of injection units of different size, using two tie rod mounting sockets whch are clampable to the die carrier plate and thereby also serve to produce an axial preload on the tie rod connections of the die closing unit in the die carrier plate.

8 Claims, 4 Drawing Figures

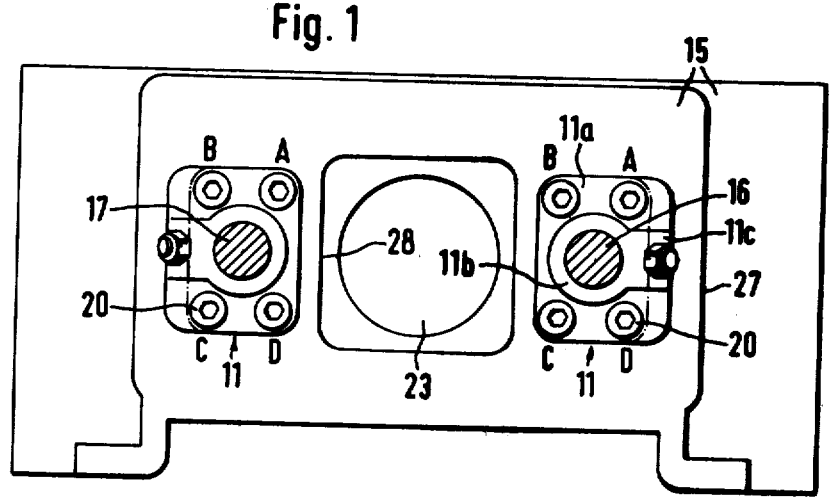
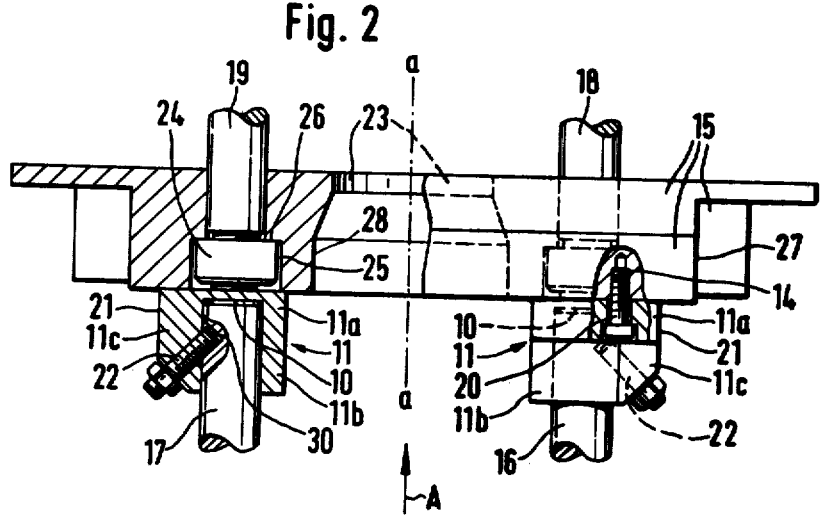

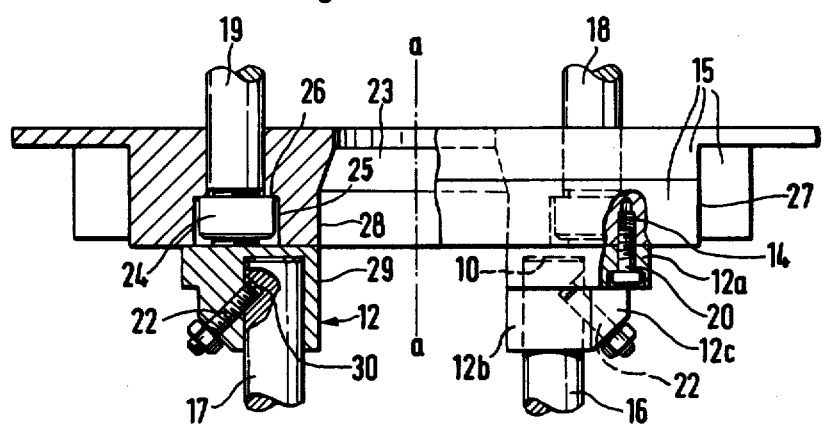
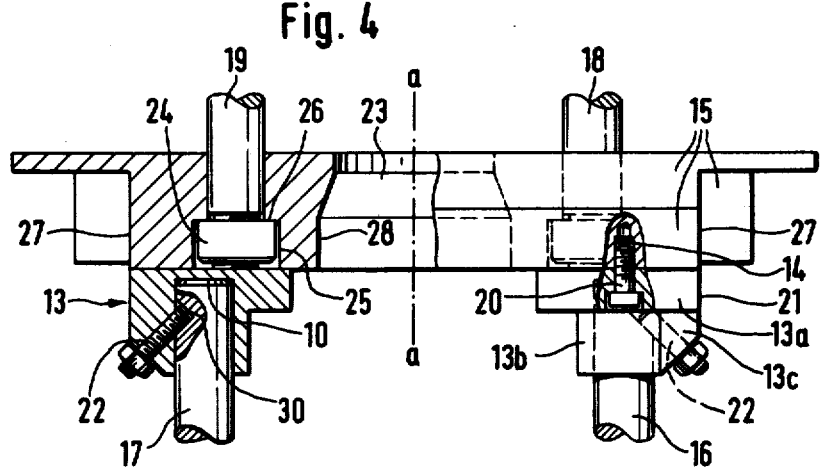

ARRANGEMENT FOR INTERCHANGEABLY MOUNTING DIFFERENT INJECTION UNITS ON AN INJECTION MOLDING MACHINE

BACKGROUND OF THE INVENTION

1. Field of the Invention

The present invention relates to injection molding machines, and, more particularly, to a die closing unit of an injection molding machine which includes a mounting arrangement for the interchangeable attachment to the die closing unit of injection units of different size.

2. Description of the Prior Art

Among die closing units for injection molding machines of the push-type, i.e. where the movable die half is pushed closed against the stationary die half, the most popular versions feature the use of a pair of parallel tie rods for the guidance of the movable die carrier plate and its attached movable die half. Besides serving as guide members, these stationary tie rods also serve as rigid frame members, linking the stationary die carrier plate on one end of the die closing unit to a stationary thrust plate, or a stationary cylinder head plate, on the other end of the die closing unit.

In most cases, the injection unit for such an injection molding machine also features two parallel tie rods which support and guide the injection unit. Where the injection unit is arranged for injection in the axial direction, through the stationary die carrier plate, the tie rods of the injection unit are preferably of the same diameter and axially aligned with the tie rods of the die closing unit. The extremities of both sets of tie rods are rigidly attached to the stationary die carrier plate, meaning that, while the tie rods of the die closing unit extend forwardly from the die carrier plate, the tie rods of the injection unit extend rearwardly from the same plate. The latter has appropriate seating bores and tie rod clamping means for this purpose.

Under certain circumstances, it becomes desirable to connect to the die closing unit an injection unit of a different size which may have tie rods which are spaced differently from the tie rods of the die closing unit. In the past, such a combination would require the use of a special adaptor unit which had a pair of forwardly extending short centering trunnions engaging the tie rod seats in the stationary die carrier plate and a pair of rearwardly facing tie rod seats having the special spacing required for the injection unit tie rods. Such a solution is disclosed in German Pat. No. 1 629 709. It implies the necessity of attaching to the stationary die carrier plate a comparatively heavy adaptor unit which, in order to provide the necessary stability, has to be of one piece, extending across the center axis of the unit, and having a large central opening for the injection cylinder. One shortcoming of this solution, apart from its cost, is the fact that the adaptor unit shifts the position of the entire injection unit rearwardly a considerable distance away from the die closing unit.

SUMMARY OF THE INVENTION

Underlying the present invention is the primary objective of providing an improved solution to the need for interchangeably attaching injection units of different size to a die closing unit of the type described above which, while being less expensive, results in a more compact overall arrangement of the tie rod attachment, without diminishing the rigidity of the tie rod connections.

The present invention proposes to attain this objective by suggesting a tie rod mounting arrangement which combines axially preloaded tie rod connections for the two tie rods of the die closing unit in the stationary die carrier plate with a pair of special mounting sockets for the tie rods of the injection unit which, when clamped against the rear side of the stationary die carrier plate, produce the earlier-mentioned axial preload for the tie rod connections.

In a preferred embodiment of the invention, the axially preloaded tie rod connections are of the type which are disclosed in my U.S. Pat. No. 4,021,181, featuring tie rod seating bores of the same diameter as the guide diameter of the tie rods and an enlarged collar member on each tie rod with an abutment face which is oriented forwardly from the tie rod extremity. This collar member bears against an abutment shoulder of the die carrier plate, under an axial clamping preload which is applied to the tie rod extremity. This clamping preload is the clamping force with which the mounting sockets for the injection unit tie rods are attached to the rear side of the die carrier plate.

One advantage of this novel configuration relates to the absence of tie rod seats for the injection unit tie rods in the stationary die carrier plate, with the result that the latter need no longer be as wide in the axial sense as in the past. Another advantage of this structure relates to the fact that the axial preload on the tie rod connections for the die closing unit is created by the abutment of a flat face on each mounting socket against the flat end face of the associated tie rod, without requiring a specific spacing of the two mounting sockets. This means that differently shaped mounting sockets and/or differently spaced mounting sockets can be attached to the same stationary die carrier plate, without affecting the characteristics of the axially preloaded tie rod connections.

In the preferred embodiment of the invention, this result is achieved by having the rear end faces of the tie rods of the die closing unit protrude by a very small distance over the rear mounting face of the stationary die carrier plate, so that, when the mounting sockets are clamped against that rear mounting face of the plate, they create the desired axial preload on the tie rods. This preload is preferably adjustable, as a result of the arrangement of a threaded length portion on each tie rod which carries the collar member in the form of a threaded positioning nut of which the inner extremity serves as the earlier-mentioned abutment face.

The arrangement of four threaded bores around each tie rod connection in the die carrier plate, in an equidistant relationship to the tie rod, assures that the mounting sockets for the injection unit tie rods are correctly aligned and centered, whether the transverse distance between their tie rod seats corresponds to the tie rod spacing of the die closing unit, or whether that distance is greater or smaller than the basic tie rod spacing. Thus, while different injection units with differently spaced tie rods may require differently shaped mounting sockets, these mounting sockets are interchangeably attachable to the stationary die carrier plate of the die closing unit, and each pair of mounting sockets, regardless of shape, serves as the preloading means for the tie rod connections of the die closing unit.

BRIEF DESCRIPTION OF THE DRAWINGS

Further special features and advantages of the invention will become apparent from the description following below, when taken together with the accompanying drawings which illustrate, by way of example, preferred embodiments of the invention which are represented in the various figures as follows:

FIG. 1 shows portions of a die closing unit of an injection molding machine, as seen in an elevational view from the rear side (arrow A in FIG. 2) of the unit, representing an embodiment of the invention;

FIG. 2 shows, in a plan view which is partially cross-sectioned, relevant portions of the die closing unit of FIG. 1, including a stationary die carrier plate with tie rod connections and tie rod mounting sockets for a standard-size injection unit having identically spaced tie rods;

FIG. 3 is a representation which is similar to FIG. 2, showing tie rod mounting sockets for a smaller injection unit with closer spaced tie rods; and FIG. 4 is a representation which is likewise similar to FIG. 2, showing tie rod mounting sockets for a larger injection unit with tie rods which are spaced farther apart.

DESCRIPTION OF THE PREFERRED EMBODIMENT

Referring to the drawings, FIGS. 1 and 2 show portions of a push-type die closing unit and of an axially connected injection unit. In a push-type die closing unit, the movable die half is guided on two stationary tie rods, and the closing force is applied to it in a pushing sense by means of a knee lever mechanism, or by means of the pressure piston of a hydraulic actuator. In both cases, the tie rods constitute the longitudinal members of a rigid frame, being connected on one extremity to a stationary die carrier plate and on the other extremity to a thrust plate, in the case of a knee lever unit, or to a cylinder head plate, in the case of a pressure piston unit. Examples of these die closing units are disclosed in my U.S. Pat. No. 3,976,416 and No. 4,080,144. (In a pull-type die closing unit, the tie rods are extensions of piston rods which are connected to the movable die carrier plate, closing the die in a pulling action.)

FIGS. 1 and 2 show a stationary die carrier plate 15 which extends transversely to the main axis a—a of the die closing unit and two tie rods 18 and 19 in a parallel and equidistant relationship to the axis a—a. FIG. 2 shows only the rear extremities of the tie rods 18 and 19, where they are attached to the stationary die carrier plate 15. For this purpose, the plate 15 has two seating bores 25, each having a fitted bore portion for the main diameter of the tie rod and an enlarged bore portion accommodating a collar member in the form of a positioning nut 24. The latter bears against an abutment shoulder 26 of plate 15.

The stationary die carrier plate 15 has planar mounting faces on both axial sides. The front face of plate 15 serves as a mounting face for a stationary die half. To the rear face of plate 15 is attached an injection unit of which FIG. 2 shows only the forward end portions of its tie rods 16 and 17. The longitudinal center axis of this injection unit coincides with the main axis a—a of the die closing unit, for injection through the stationary die half, at right angles to the separation plane of the injection molding die. For this purpose, the stationary die carrier plate 15 has a central opening 23 through which the plastification cylinder of the injection unit reaches into the stationary die half.

The tie rods 16 and 17 of the injection unit are preferably of the same diameter as the tie rods 18 and 19 of the die closing unit. In the embodiment of FIG. 2, the two pairs of tie rods also have the same transverse spacing. The embodiment of FIG. 3 shows the tie rods 16 and 17 more closely spaced, for a smaller injection unit, whereas the embodiment of FIG. 4 has tie rods 16 and 17 which are spaced further apart, for a larger than normal injection unit.

This interchangeability of injection units of different size is accomplished by means of a pair of special mounting sockets 11 for the tie rods 16 and 17 of the injection unit. Each mounting socket 11 consists of a base portion 11a of rectangular outline, a rearwardly extending collar portion 11b surrounding a tie rod seat 10 in the form of a blind hold, and a radially outwardly protruding hump portion 11c. The base portion 11a has countersunk bores for four clamping screws 20 which engage the threaded bores 14 of the die carrier plate 15. In the hump portion 11c is arranged an inclined threaded bore for a rod clamping bolt 22 which engages an oblique recess 30 of the tie rod, clamping it against the bottom of the tie rod seat 10.

The embodiment of FIG. 3 features two modified mounting sockets 12 with tie rod seats 10 which are spaced more closely, for a smaller injection unit. Each mounting socket 12 consists again of a base portion 12a of rectangular outline, a collar portion 12b surrounding the tie rod seat 10, and a radially outwardly protruding hump portion 12c for the inclined rod clamping bolt 22. The base portion 12a of each mounting socket is so arranged that the location of its four countersunk bores for the clamping screws 20 is unchanged from the configuration of FIG. 2. The inner side edges 29 of the two mounting sockets 12 may be so arranged that they are in alignment with the lateral inner faces 28 of the rectangular portion of the central opening 23.

In the embodiment of FIG. 4, the mounting sockets 13 are arranged for the tie rods of a larger than normal injection unit. Each mounting socket 13 consists again of a base portion 13a of rectangular outline, a collar portion 13b surrounding the tie rod seat 10, and a radially outwardly protruding hump portion 13c for the inclined rod clamping bolt 22. The location of the countersunk bores for the four clamping screws 20 is again unchanged with respect to the die carrier plate 15, so that only one set of threaded bores 14 in the plate 15 is necessary. The outer side edges 21 of the two mounting sockets 13 may be arranged in alignment with the lateral outer faces 27 of the stationary die carrier plate 15.

By arranging the base portions of the three different mounting sockets 11, 12, and 13 for identical locations of the clamping screws 20, their interchangeability becomes extremely simple. The base portions 11a, 12a, and 13a of these mounting sockets, while differing in their overall rectangular outline, cover all a central rectangular area which is defined by the corner points A, B, D and C in FIG. 1. The tie rod axis is the center of this rectangle.

The mounting sockets of the invention thus serve a double purpose, by positioning the tie rods of the injection unit and by applying an axial preload to the tie rod connections for the tie rods 18 and 19 of the die closing unit. The positioning nuts 24 of the tie rod connections are preferably so adjusted that, when the four clamping screws 20 of each mounting socket are fully tightened, the clamping faces of their base portions are in contact with the rear face of the stationary die carrier plate 15, while applying a predetermined axial preload to the tie rod connections of the die closing unit. This preload can be increased or decreased through an adjustment of the positioning nut 24. While it is also possible for the tie rod connections to be so adjusted that the mounting sockets bear exclusively on the tie rod end faces, leaving a small clearance to the back side of plate 15, such an arrangement requires a very careful tightening of the clamping screws 20.

It should be understood, of course, that the foregoing disclosure describes only preferred embodiments of the invention and that it is intended to cover all changes and modifications of these examples of the invention which fall within the scope of the appended claims.

I claim the following:

1. In an injection molding machine which comprises a die closing unit with a longitudinal center axis along which the unit executes opening and closing movements and which has, as a part of said unit, a stationary die carrier plate extending transversely to the center axis, a movable die carrier plate and two die closing unit tie rods which are parallel to and equidistant from the center axis, extending forwardly from the stationary die carrier plate, to serve as guides for the movable die carrier plate, the tie rods having their rear extremities rigidly clamped to the stationary die carrier plate by means of preloaded tie rod connections, in such a machine, an arrangement in association with said preloaded tie rod connections for selectively and interchangeably mounting to the rear side of the stationary die carrier plate several axially oriented injection units of varying size, each having a pair of injection unit tie rods, the spacing of which is either equal to, larger, or smaller than the spacing of the two tie rods of the die closing unit, the mounting arrangement comprising in combination:

as part of said preloaded tie rod connections, two tie rod seating bores in the stationary die carrier plate, each seating bore having a fitted bore portion and, on the rear side of the plate, an enlarged recess bore portion forming an axially rearwardly oriented abutment shoulder around the fitted bore portion;

also as part of said tie rod connections, a matching end portion on each of the two tie rods of the die closing unit having a fitted tie rod length portion engaging the fitted bore portion, an enlarged collar member to the rear of the fitted length portion received inside the enlarged recess bore portion so as to engage its abutment shoulder, and a rearwardly oriented tie rod end face; and two tie rod mounting sockets which are attachable to the forward extremities of the two tie rods of an injection unit, each mounting socket having an axially forwardly oriented clamping face which is clampable against the end face of one of the two die closing unit tie rods, thereby axially preloading its collar member against the abutment shoulder; and wherein each mounting socket further includes fastener means engaging the mounting socket and the rear side of the die carrier plate on several attachment points around the associated tie rod seating bore, for the creation of such a clamping preload; and the two mounting sockets further include means for positioning and centering the two tie rods of the injection unit at the required tie rod spacing.

2. A mounting arrangement as defined in claim 1, wherein the enlarged collar members of the tie rod end portions in the tie rod connections are threaded positioning nuts which are adjustably seated on matchingly threaded tie rod length portions.

3. A mounting arrangement as defined in claim 1 or claim 2, wherein the stationary die carrier plate has a rearwardly oriented mounting face; and the end faces of the tie rods of the die closing unit protrude rearwardly a very small distance over said mounting face.

4. A mounting arrangement as defined in claim 3, wherein the distance by which the end faces of the tie rods protrude over the mounting face of the die carrier plate is such that, when the clamping faces of the mounting sockets are clamped against the tie rod end faces, they also abut against the mounting face of the die carrier plate, thereby limiting the amount of axial preload which is applicable to the tie rod connections of the die closing unit.

5. A mounting arrangement as defined in claim 3, wherein each tie rod mounting socket has a block-shaped base portion of generally rectangular outline, defining the clamping face as an end face thereof; and the fastener means of each mounting socket is constituted by a plurality of clamping screws which are engageable in bores in the base portion of the mounting socket and in aligned threaded bores in the die carrier plate which are located at said attachment points around the tie rod seating bore.

6. A mounting arrangement as defined in claim 5, wherein the attachment points for the clamping screws and threaded bores are located at the four corners of a regular rectangle whose center point coincides with the center of the tie rod seating bore.

7. A mounting arrangement as defined in claim 5, wherein the means for positioning and centering the tie rods of the injection unit includes a tie rod seat in the form of a blind bore in each tie rod mounting socket, a rearwardly extending collar portion forming an integral part of the mounting socket and surrounding the tie rod seat, and a radially outwardly protruding hump portion on the collar portion accommodating therein an inclined threaded bore for a rod clamping bolt.

8. A mounting arrangement as defined in claim 1, further comprising at least one second pair of similar tie rod mounting sockets which are attachable to the forward extremities of the tie rods of a different injection unit and clampable against the end faces of the two die closing unit tie rods interchangeably with the first pair of tie rod mounting sockets; and each pair of mounting sockets has means for positioning and centering the two tie rods of the associated injection unit at a different tie rod spacing.

* * * * *